United States Patent
Decesaris et al.

(10) Patent No.: US 8,959,264 B2
(45) Date of Patent: Feb. 17, 2015

(54) AUTO-SWITCHING INTERFACES TO DEVICE SUBSYSTEMS

(71) Applicant: Lenovo Enterprise Solutions (Singapore) Pte. Ltd., Singapore (SG)

(72) Inventors: Michael Decesaris, Carrboro, NC (US); Steven C. Jacobson, Mebane, NC (US); Luke D. Remis, Raleigh, NC (US); Gregory D. Sellman, Morrisville, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 13/895,829

(22) Filed: May 16, 2013

(65) Prior Publication Data

US 2014/0344487 A1    Nov. 20, 2014

(51) Int. Cl.
G06F 3/00 (2006.01)
G06F 1/00 (2006.01)
G06F 13/40 (2006.01)

(52) U.S. Cl.
CPC .................. G06F 13/4022 (2013.01)
USPC ............................. 710/51; 713/323

(58) Field of Classification Search
CPC ... H04L 43/0811; G06F 3/0227; G06F 11/00; B66B 5/02
See application file for complete search history.

(56) References Cited

U.S. PATENT DOCUMENTS

| | | |
|---|---|---|
| 4,866,667 A | 9/1989 | Shimada |
| 2004/0153696 A1* | 8/2004 | Govindaraman ................. 714/4 |
| 2005/0045726 A1 | 3/2005 | Terlizzi |
| 2005/0154799 A1 | 7/2005 | Feng et al. |
| 2006/0221386 A1 | 10/2006 | Brooks et al. |
| 2008/0126589 A1 | 5/2008 | Husain et al. |
| 2008/0151884 A1 | 6/2008 | Elberbaum |
| 2014/0013024 A1* | 1/2014 | Lamm et al. .................. 710/313 |

OTHER PUBLICATIONS

Anonymous, "GAL(R)6002: 4-TO-1 RS232 Port Multiplexer", Lattice Semiconductor Corporation, Jul. 1997, pp. 1-4.
Anonymous, "2-Port VGA Switch With Audio & Serial Control", Hall Research, 2012, pp. 1, Retrieved May 16, 2013.

* cited by examiner

Primary Examiner — Hyun Nam
(74) Attorney, Agent, or Firm — Law Office of Jim Boice

(57) ABSTRACT

A method auto-switches interfaces between a client computer and subsystems in a device under management. A first output bus from a first subsystem is coupled to a client computer via a multiplexer, wherein the first subsystem is a subsystem from multiple system subsystems in the device under management. A hardware subsystem bus monitor monitors all output busses from the multiple system subsystems for a predetermined event on a bus. In response to the predetermined event being detected on a second output bus from a second subsystem in the device under management, the multiplexor decouples the first output bus from the client computer and couples the second output bus to the client computer.

17 Claims, 4 Drawing Sheets

AUTO-SWITCHING INTERFACES TO DEVICE SUBSYSTEMS

BACKGROUND

The present disclosure relates to the field of computing hardware, and specifically to hardware devices. Still more specifically, the present disclosure relates to a design structure for selectively auto-switching to different interfaces for subsystems in a hardware device.

A server has multiple subsystems, each of which can be accessed via an interface such as an RS232 interface. These interfaces are used to individually and singularly access the subsystems for debugging, configuring, and otherwise managing the subsystems.

SUMMARY

In one embodiment of the present invention, a system comprises: a client computer; a device under management, wherein the device under management is managed by the client computer; a multiplexor within the device under management, wherein the multiplexor is coupled to multiple subsystems within the device under management via a plurality of subsystem busses, and wherein the client computer is initially coupled to a first subsystem via a first subsystem bus; a subsystem bus monitor, wherein the subsystem bus monitor monitors the plurality of subsystem busses for predefined outputs from the multiple subsystems; and a multiplexor controller, wherein the multiplexor controller automatically forces the multiplexor to switch a coupling to the client computer from the first subsystem to a second subsystem in response to the subsystem bus monitor detecting a predefined output on a second subsystem bus from the second subsystem.

In one embodiment of the present invention, a hardware description language (HDL) design structure is encoded on a machine-readable data storage medium. The HDL design structure comprises elements that, when processed in a computer-aided design system, generate a machine-executable representation of a system, wherein said system comprises: a client computer; a device under management, wherein the device under management is managed by the client computer; a multiplexor within the device under management, wherein the multiplexor is coupled to multiple subsystems within the device under management via a plurality of subsystem busses, and wherein the client computer is initially coupled to a first subsystem via a first subsystem bus; a subsystem bus monitor, wherein the subsystem bus monitor monitors the plurality of subsystem busses for predefined outputs from the multiple subsystems; and a multiplexor controller, wherein the multiplexor controller automatically forces the multiplexor to switch a coupling to the client computer from the first subsystem to a second subsystem in response to the subsystem bus monitor detecting a predefined output on a second subsystem bus from the second subsystem.

In one embodiment of the present invention, a method auto-switches interfaces between a client computer and different subsystems in a device under management. A first output bus from a first subsystem is coupled to a client computer via a multiplexer, wherein the first subsystem is a subsystem from multiple system subsystems in the device under management. A hardware subsystem bus monitor monitors all output busses from the multiple system subsystems for a predetermined event on a bus. In response to the predetermined event being detected on a second output bus from a second subsystem in the device under management, the multiplexor decouples the first output bus from the client computer and couples the second output bus to the client computer.

The above as well as additional objectives, features, and advantages of the present invention will become apparent in the following detailed written description.

BRIEF DESCRIPTION OF THE SEVERAL VIEWS OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION

Figure 1:
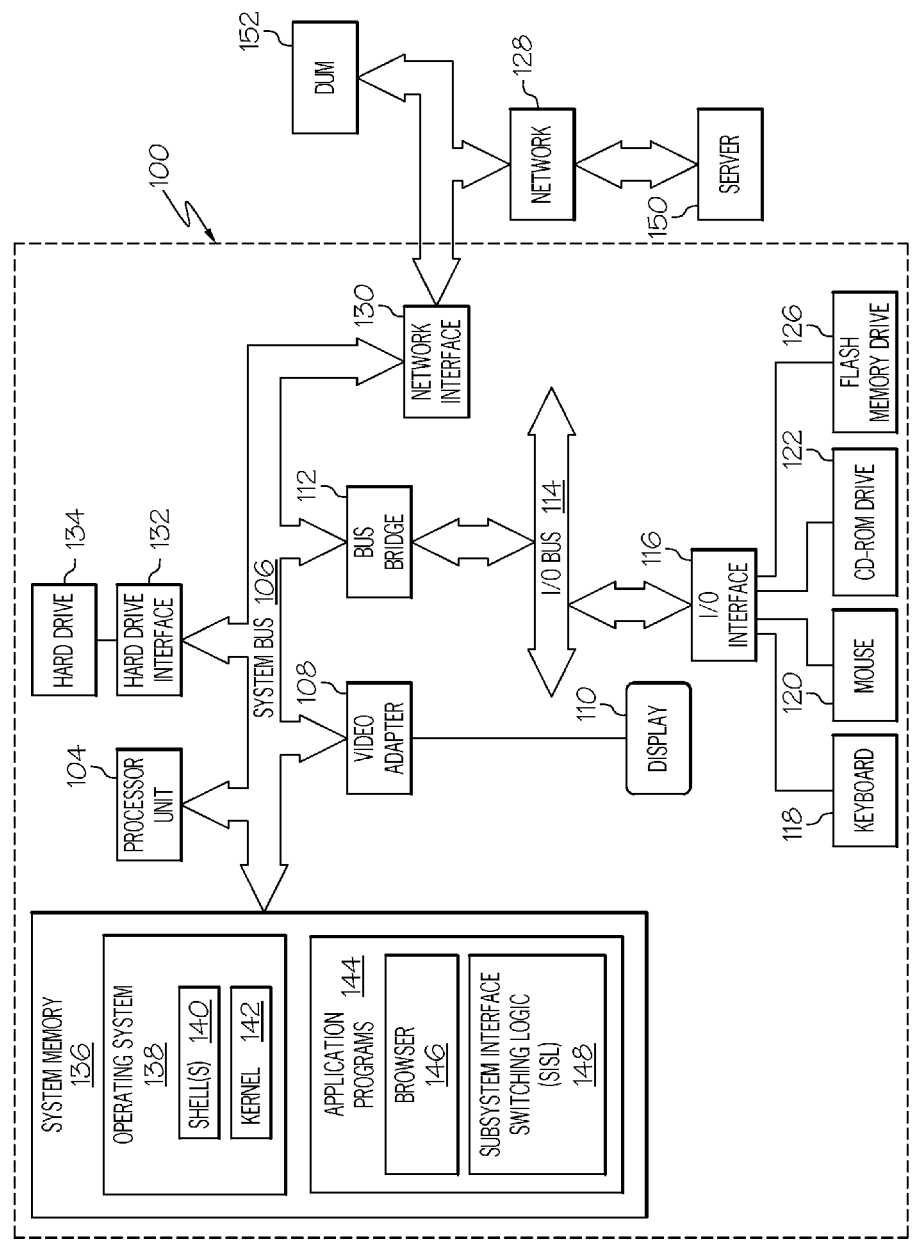
FIG. 1 depicts an exemplary physical computer in which the present invention may be implemented and/or utilized.

With reference now to FIG. 1, there is depicted a block diagram of an exemplary computer 100, with which and/or in which the present invention may be utilized. Computer 100 includes a processor unit 104 that is coupled to a system bus 106. A video adapter 108, which drives/supports a display 110, is also coupled to system bus 106. System bus 106 is coupled via a bus bridge 112 to an Input/Output (I/O) bus 114. An I/O interface 116 is coupled to I/O bus 114. I/O interface 116 affords communication with various I/O devices, including a keyboard 118, a mouse 120, a Compact Disk-Read Only Memory (CD-ROM) drive 122, and a flash memory drive 126. The format of the ports connected to I/O interface 116 may be any known to those skilled in the art of computer architecture, including but not limited to Universal Serial Bus (USB) ports.

Computer 100 is able to communicate with a server 150 via a network 128 using a network interface 130, which is coupled to system bus 106. Network 128 may be an external network such as the Internet, or an internal network such as an Ethernet or a Virtual Private Network (VPN). Server 150 and/or a Device Under Management (DUM) 152 may be architecturally configured in the manner depicted for computer 100.

A hard drive interface 132 is also coupled to system bus 106. Hard drive interface 132 interfaces with a hard drive 134. In one embodiment, hard drive 134 populates a system memory 136, which is also coupled to system bus 106. System memory 136 is defined as a lowest level of volatile memory in computer 100. This volatile memory may include additional higher levels of volatile memory (not shown), including, but not limited to, cache memory, registers, and buffers. Code that populates system memory 136 includes an operating system (OS) 138 and application programs 144.

OS 138 includes a shell 140, for providing transparent user access to resources such as application programs 144. Generally, shell 140 (as it is called in UNIX®—UNIX is a registered trademark of The Open Group in the United States and other countries), also called a command processor in Windows® (WINDOWS is a registered trademark of Microsoft Corporation in the United States and other countries), is a program that provides an interpreter and an interface between the user and the operating system, and is generally the highest level of the operating system software hierarchy and serves as a command interpreter. Thus, shell 140 provides a system prompt, interprets commands entered by keyboard 118, mouse 120, or other user input media, and sends the interpreted command(s) to the appropriate lower levels of the operating system (e.g., kernel 142) for processing. As depicted, OS 138 also includes kernel 142, which includes lower levels of functionality for OS 138. Kernel 142 provides essential services required by other parts of OS 138 and application programs 144. The services provided by kernel 142 include memory management, process and task management, disk management, and I/O device management.

Application programs 144 include a browser 146. Browser 146 includes program modules and instructions enabling a World Wide Web (WWW) client (i.e., computer 100) to send and receive network messages to the Internet. Computer 100 may utilize HyperText Transfer Protocol (HTTP) messaging to enable communication with server 150. Application programs 144 in system memory 136 also include a Subsystem Interface Switching Logic (SISL) 148, which, in one embodiment, executes the process described below in FIG. 3 and/or FIG. 4. In one embodiment, computer 100 is able to download SISL 148 from service provider server 150, preferably in an "on demand" basis.

The hardware elements depicted in computer 100 are not intended to be exhaustive, but rather are representative to highlight essential components required by the present invention. For instance, computer 100 may include alternate memory storage devices such as magnetic cassettes, Digital Versatile Disks (DVDs), Bernoulli cartridges, and the like. These and other variations are intended to be within the spirit and scope of the present invention. Note that the hardware architecture for service provider server 150 may be substantially similar to that shown for computer 100.

Figure 2:
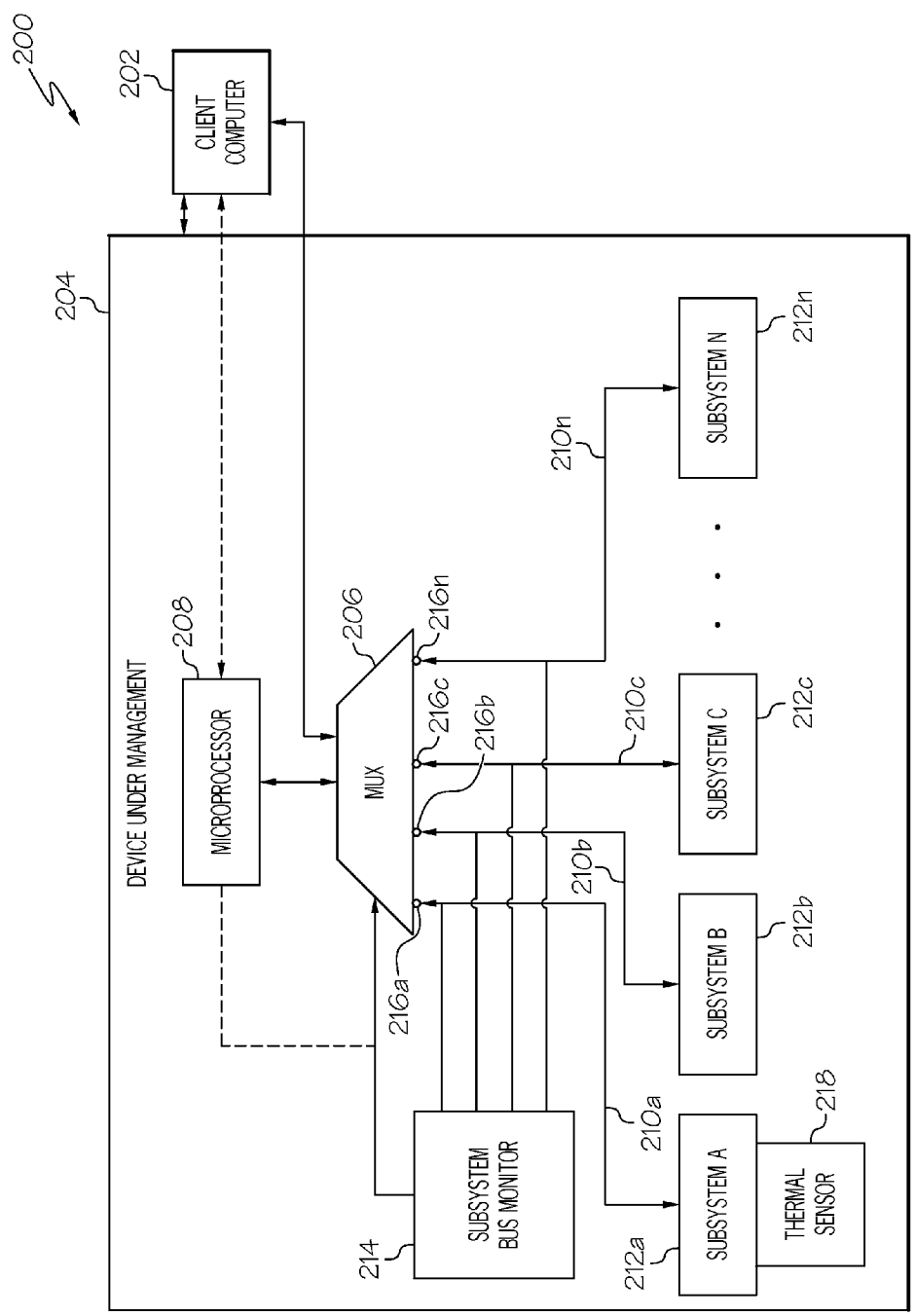
FIG. 2 illustrates an exemplary system used to automatically couple specific subsystems to a client computer that manages the subsystems.

Referring now to FIG. 2, an exemplary system 200 used to automatically couple specific subsystems to a client computer that manages the subsystems is presented. A client computer 202 (e.g., computer 100 shown in FIG. 1) is coupled to a Device Under Management (DUM) 204 (e.g., DUM 152 shown in FIG. 1). In one embodiment, the client computer 202 is directly coupled to a multiplexor (MUX) 206 within the DUM 204, while in another embodiment client computer 202 is coupled to MUX 206 via a microprocessor 208. In either embodiment, the MUX 206 is coupled to multiple subsystem busses 210a-210n (where "n" is an integer), each of which is coupled to a particular subsystem 212a-212n within the DUM 204. As described in further detail herein, a subsystem bus monitor 214 monitors the data/signal traffic on the subsystem busses 210a-210n in order to detect a predefined condition.

In response to a predefined condition being detected, the MUX 206 switches from one of the MUX ports 216a-216n to another of the MUX ports 216a-216n, thereby coupling a different subsystem (from subsystems 212a-212n) to the client computer 202. This decoupling/coupling can be performed directly by the subsystem bus monitor 214 inputting a MUX control signal to the MUX 206, or the decoupling/coupling can be under the control of the microprocessor 208 inputting the MUX control signal to the MUX 206. Consider now the following embodiments.

In one embodiment, all of the subsystems 212a-212n are a same type of subsystem. In another embodiment, one or more of the subsystems 212a-212n are different from other subsystems from subsystems 212a-212n. In either embodiment, these subsystems 212a-212n may be of various types/architectures.

For example, subsystem A (212a), and/or one or more of the other subsystems 212a-212n, may be a Baseboard Management Controller (BMC), which is a specialized microcontroller embedded on a motherboard of a computing device such as a server. The BMC manages an interface between software that manages the server and the hardware on the server. For example, different components of the server (including, but not limited to other subsystems from subsystems 212a-212n) may have integrated sensors that monitor temperature (e.g., thermal sensor 218 shown coupled to subsystem A-212a), cooling fan speed, power usage, operating system and/or application status, etc. The BMC receives signals from these sensors, which may indicate an anomaly (e.g., an error, fault, etc.) within the server.

In one embodiment, exemplary subsystem B (212b), and/or one or more of the other subsystems 212a-212n, is a Hard Drive Controller (HDC), which is hardware (e.g., equivalent to hard drive interface 132 shown in FIG. 1) that controls and monitors the operations of a hard drive (e.g., hard drive 134 shown in FIG. 1). Thus, the HDC monitors the level of data traffic to and from a hard drive, how much power a particular hard drive is using, how often a page fault or other reading error occurs within a particular hard drive, etc.

In one embodiment, exemplary subsystem C (212c), and/or one or more of the other subsystems 212a-212n, is a Basic Input/Output System (BIOS). A BIOS is a hardware/firmware device that initializes and tests a system's hardware during startup (i.e., when powered on). The BIOS then controls the loading of an Operating System (OS) and application programs into the system (e.g., system memory) from mass memory.

In one embodiment, exemplary subsystem N (212n), and/or one or more of the other subsystems 212a-212n, is an Ethernet device. This Ethernet device may be an Ethernet connector, which can be connected to any Ethernet-capable device, or it may the Ethernet-capable device itself.

In one embodiment, exemplary subsystem N (212n), and/or one or more of the other subsystems 212a-212n, is a Field Programmable Gate Array (FPGA). An FPGA is an integrated circuit that is configurable by a user, such that certain logic blocks within the FPGA can be activated while others are deactivated, through the use of fusing and other hardware programming techniques.

Continuing with FIG. 2, the subsystem bus monitor 214 monitors the subsystem busses 210a-210n (also known as "output busses" when describing busses that carry output signals from subsystems) for certain predetermined conditions. Examples of such predetermined conditions are as follows.

In one embodiment, the predetermined condition is that a currently-used subsystem bus is idle while there is traffic on another subsystem bus. For example, assume that subsystem A (212a) is initially coupled to the client computer 202 via subsystem bus 210a and MUX port 216a. Assume further that there is no data/signal traffic on subsystem bus 210a, because subsystem A (212a) is idle, broken, turned off, etc. Assume further that there is data/signal traffic on subsystem bus 210b, because subsystem B (212b) is active, in either a normal mode (i.e., operating without any errors) or in an anomalous mode (i.e., there is some type of error occurring within subsystem B, such as overheating, excessive power drawing, is overusing an internal processor, etc.). As there is no reason for client computer 202 to keep monitoring subsystem A (which is idle), then the MUX 206 automatically switches over to MUX port 216b, in order to permit the client computer 202 to monitor the activities of active subsystem B (212b).

In one embodiment, the predetermined condition is that one of the subsystems 212a-212n has experienced an event. For example, assume that all of the subsystems 212a-212n are operating normally (i.e., within predefined ranges for power consumption, temperature, resource usage, etc.) except for subsystem C (212c). Subsystem bus monitor 214 detects that subsystem C (212c) is experiencing an event, which may be an error or non-error. For example, subsystem bus monitor 214 may detect a data packet, whose header identifies it as a description of a fault within subsystem C. This data packet may be sent to microprocessor 208, which then analyzes the message and takes the appropriate action (i.e., sending a signal to the MUX 206 to switch from currently-used MUX port 216a to MUX port 216c). In one embodiment, the subsystem bus monitor 214 has enough internal hardware and/or software logic to recognize the signals on the subsystem bus 210c as being indicative of a certain type of event. Again, note that this event may be an error (e.g., some type of fault being experienced by a particular subsystem) or a non-error. For example, a non-error may simply be a signal indicating that a particular subsystem is in the process of coming out of hibernation, which would be of interest to the client computer 202 that is monitoring the DUM 204.

In any of the above-described embodiments/scenarios, once the control signal to the MUX 206 changes which port from MUX ports 216a-216n is being switched to, data coming from the MUX 206 to the client computer 202 is stamped with 1) an identification of the newly activated MUX port; 2) an identification of which subsystem is generating the bit stream; and/or 3) the time that the MUX 206 switched from one MUX port to another MUX port (from MUX ports 216a-216n).

Note that the subsystems 212a-212n may be coupled to their respective subsystem busses 210a-210n via any type of interface. In one embodiment, however, these subsystems interface with their particular busses via an RS232 interface (not shown). An RS232 interface provides an interface to any of the subsystems, which may be viewed as peripheral devices within the server being monitored by the client computer.

Figure 3:
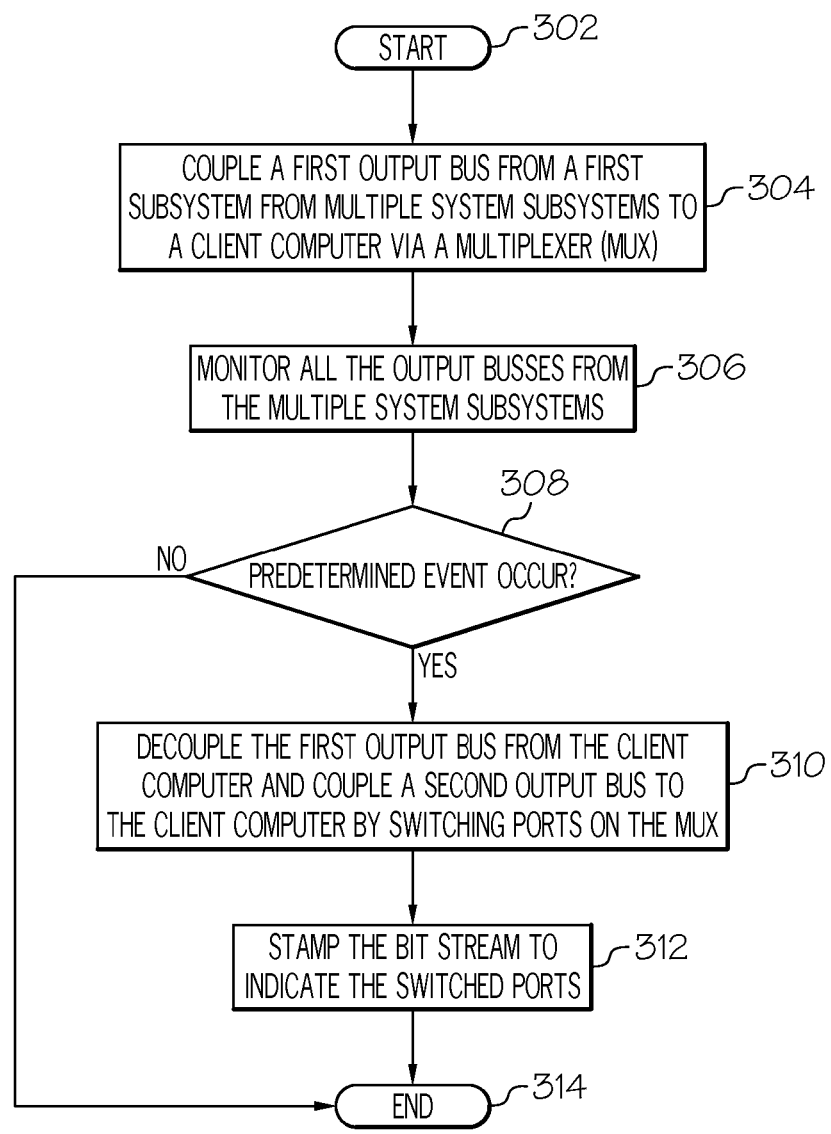
FIG. 3 is a high-level flow chart of exemplary steps performed by a system to selectively and automatically couple specific subsystems to a client computer that manages the subsystems.

With reference now to FIG. 3, a high-level flow chart of exemplary steps performed by a system to selectively and automatically couple specific subsystems to a client computer that manages the subsystems is presented. After initiator block 302, a first output bus (i.e., a first subsystem bus) from a first subsystem is coupled to a client computer via a multiplexer (MUX), as described in block 304. As depicted in FIG. 2, the first subsystem (e.g., subsystem A) is a subsystem from multiple system subsystems (A-N) in the device under management (e.g., DUM 204).

As described in block 306, a hardware subsystem bus monitor monitors all output busses from the multiple system subsystems, looking for a predetermined event on a bus. As described herein, this predetermined event may be an error or a non-error. Examples of an error include, but are not limited to, a subsystem overheating, using too much power, overusing its processor, having a hard drive fault (e.g., a reading/writing error), having a failure in network (such as an Ethernet), etc. The signal/message on the monitored subsystem bus may include a description of, or at least data indicative of, a cause of the error (e.g., a failed component, an overused component, etc.). Examples of non-errors include, but are not limited to, a subsystem bus simply carrying more data/signals than another subsystem bus, even if this greater usage is not outside of a normal operating range; a subsystem and/or the entire device under management being initialized, coming out of hibernation, etc.; and/or any predetermined event (e.g., a login signal, execution of a test program etc.) to one or more of the subsystems and/or entire device under management.

As depicted in query block 308, if such a predetermined event occurs, indicating the need to switch monitoring from one subsystem to another subsystem, then a first subsystem (which is currently coupled to the client computer via the MUX) is decoupled, and the appropriate second subsystem is coupled to the client computer via the MUX (block 310). As described in block 312, in one embodiment the bit stream of data, which is going from the second subsystem to the client computer via the MUX, is stamped to indicate that it is coming from the second subsystem. Thus, the client computer is alerted that the data stream that was previously being received from the first subsystem is no longer being received, and the new data stream is coming from the second subsystem. The process ends at terminator block 314.

Figure 4:
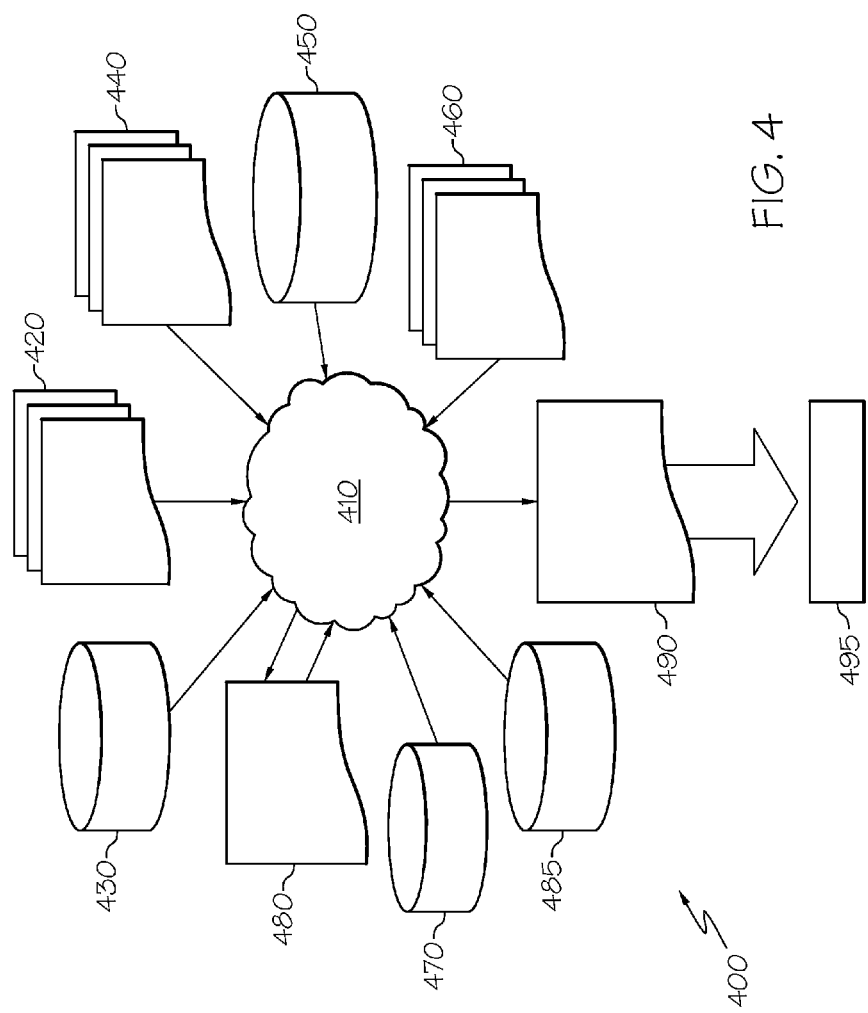
FIG. 4 is a flow diagram of a design process used in semi-conductor design, manufacturing, and/or testing of the presently described exemplary system.

With reference now to FIG. 4, there is depicted a block diagram of an exemplary design flow 400 used for example, in semiconductor IC logic design, simulation, testing, layout, and manufacturing. Design flow 400 includes processes, machines and/or mechanisms for processing design structures or devices to generate logically or otherwise functionally equivalent representations of the design structures and/or devices described above and shown in FIGS. 2-3. The design structures processed and/or generated by design flow 400 may be encoded on machine-readable transmission or storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 400 may vary depending on the type of representation being designed. For example, a design flow 400 for building an application specific IC (ASIC) may differ from a design flow 400 for designing a standard component or from a design flow 400 for instantiating the design into a programmable array, for example a programmable gate array (PGA) or a field programmable gate array (FPGA) offered by Altera® Inc. or Xilinx® Inc.

FIG. 4 illustrates multiple such design structures including an input design structure 420 that is preferably processed by a design process 410. Design structure 420 may be a logical simulation design structure generated and processed by design process 410 to produce a logically equivalent functional representation of a hardware device. Design structure 420 may also or alternatively comprise data and/or program instructions that when processed by design process 410, generate a functional representation of the physical structure of a hardware device. Whether representing functional and/or structural design features, design structure 420 may be generated using electronic computer-aided design (ECAD) such as implemented by a core developer/designer. When encoded on a machine-readable data transmission, gate array, or storage medium, design structure 420 may be accessed and processed by one or more hardware and/or software modules within design process 410 to simulate or otherwise functionally represent an electronic component, circuit, electronic or logic module, apparatus, device, or system such as those shown in FIGS. 2-3. As such, design structure 420 may comprise files or other data structures including human and/or machine-readable source code, compiled structures, and computer-executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 410 preferably employs and incorporates hardware and/or software modules for synthesizing, translating, or otherwise processing a design/simulation functional equivalent of the components, circuits, devices, or logic structures shown in FIGS. 2-3 to generate a netlist 480 which may contain design structures such as design structure 420. Netlist 480 may comprise, for example, compiled or otherwise processed data structures representing a list of wires, discrete components, logic gates, control circuits, I/O devices, models, etc. that describes the connections to other elements and circuits in an integrated circuit design. Netlist 480 may be synthesized using an iterative process in which netlist 480 is resynthesized one or more times depending on design specifications and parameters for the device. As with other design structure types described herein, netlist 480 may be recorded on a machine-readable data storage medium or programmed into a programmable gate array. The medium may be a non-volatile storage medium such as a magnetic or optical disk drive, a programmable gate array, a compact flash, or other flash memory. Additionally, or in the alternative, the medium may be a system or cache memory, buffer space, or electrically or optically conductive devices and materials on which data packets may be transmitted and intermediately stored via the Internet, or other networking suitable means.

Design process 410 may include hardware and software modules for processing a variety of input data structure types including netlist 480. Such data structure types may reside, for example, within library elements 430 and include a set of commonly used elements, circuits, and devices, including models, layouts, and symbolic representations, for a given manufacturing technology (e.g., different technology nodes, 32 nm, 45 nm, 50 nm, etc.). The data structure types may further include design specifications 440, characterization data 450, verification data 460, design rules 470, and test data files 485 which may include input test patterns, output test results, and other testing information. Design process 410 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 410 without deviating from the scope and spirit of the invention. Design process 410 may also include modules for performing standard circuit design processes such as timing analysis, verification, design rule checking, place and route operations, etc.

Design process 410 employs and incorporates logic and physical design tools such as HDL compilers and simulation model build tools to process design structure 420 together with some or all of the depicted supporting data structures along with any additional mechanical design or data (if applicable), to generate a second design structure 490. Design structure 490 resides on a storage medium or programmable gate array in a data format used for the exchange of data of mechanical devices and structures (e.g. information stored in a IGES, DXF, Parasolid XT, JT, DRG, or any other suitable format for storing or rendering such mechanical design structures). Similar to design structure 420, design structure 490 preferably comprises one or more files, data structures, or other computer-encoded data or instructions that reside on transmission or data storage media and that when processed by an ECAD system generate a logically or otherwise functionally equivalent form of one or more of the embodiments of the invention shown in FIGS. 2-3. In one embodiment, design structure 490 may comprise a compiled, executable HDL simulation model that functionally simulates the devices shown in FIGS. 2-3.

Design structure 490 may also employ a data format used for the exchange of layout data of integrated circuits and/or symbolic data format (e.g. information stored in a GDSII (GDS2), GL1, OASIS, map files, or any other suitable format for storing such design data structures). Design structure 490 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described above and shown in FIGS. 2-3. Design structure 490 may then proceed to a stage 495 where, for example, design structure 490: proceeds to tape-out, is released to manufacturing, is released to a mask house, is sent to another design house, is sent back to the customer, etc.

Note that the flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. A system comprising:
a client computer;
a device under management, wherein the device under management is managed by the client computer;
a multiplexor within the device under management, wherein the multiplexor is coupled to multiple subsystems within the device under management via a plurality of subsystem busses, and wherein the client computer is initially coupled to a first subsystem via a first subsystem bus;
a subsystem bus monitor, wherein the subsystem bus monitor monitors the plurality of subsystem busses for predefined outputs from the multiple subsystems; and
a multiplexor controller, wherein the multiplexor controller automatically forces the multiplexor to switch a coupling to the client computer from the first subsystem to a second subsystem in response to the subsystem bus monitor detecting a predefined output on a second subsystem bus from the second subsystem, and wherein the predefined output on the second subsystem bus is a predefined anomaly in the second subsystem.

2. The system of claim 1, wherein the predefined output on the second subsystem bus is a greater amount of data traffic than an amount of data traffic found on the first subsystem bus.

3. The system of claim 1, wherein the predefined anomaly is a temperature reading on the second subsystem that exceeds a predetermined level.

4. The system of claim 1, wherein the second subsystem comprises a second subsystem processor, and wherein the predefined anomaly is a processor usage level in the second subsystem processor that exceeds a predetermined level.

5. The system of claim 1, wherein the multiple subsystems in the server comprise a Baseboard Management Controller (BMC), a Hard Drive Controller (HDC), a Field Programmable Gate Array (FPGA), a Basic Input/Output System (BIOS), and an Ethernet device.

6. A hardware description language (HDL) design structure encoded on a non-transitory machine-readable data storage medium, said HDL design structure comprising elements that, when processed in a computer-aided design system, generate a machine-executable representation of a system, wherein said system comprises:
a client computer;
a device under management, wherein the device under management is managed by the client computer;
a multiplexor within the device under management, wherein the multiplexor is coupled to multiple subsystems within the device under management via a plurality of subsystem busses, and wherein the client computer is initially coupled to a first subsystem via a first subsystem bus;
a subsystem bus monitor, wherein the subsystem bus monitor monitors the plurality of subsystem busses for predefined outputs from the multiple subsystems; and
a multiplexor controller, wherein the multiplexor controller automatically forces the multiplexor to switch a coupling to the client computer from the first subsystem to a second subsystem in response to the subsystem bus monitor detecting a predefined output on a second subsystem bus from the second subsystem, and wherein the predefined output on the second subsystem bus is a predefined anomaly in the second subsystem.

7. The HDL design structure of claim 6, wherein the predefined output on the second subsystem bus is a greater amount of data traffic than an amount of data traffic found on the first subsystem bus.

8. The HDL design structure of claim 6, wherein the predefined anomaly is a temperature reading on the second subsystem that exceeds a predetermined level.

9. The HDL design structure of claim 6, wherein the second subsystem comprises a second subsystem processor, and wherein the predefined anomaly is a processor usage level in the second subsystem processor that exceeds a predetermined level.

10. The HDL design structure of claim 6, wherein the device under management is a server.

11. The HDL design structure of claim 6, the multiple subsystems in the server comprise a Baseboard Management Controller (BMC), a Hard Drive Controller (HDC), a Field Programmable Gate Array (FPGA), a Basic Input/Output System (BIOS), and an Ethernet device.

12. A method of auto-switching interfaces between a client computer and subsystems in a device under management, the method comprising:
coupling a first output bus from a first subsystem to a client computer via a multiplexer, wherein the first subsystem is a subsystem from multiple system subsystems in the device under management;
monitoring, by a hardware subsystem bus monitor, all output busses from the multiple system subsystems for a predetermined event on a bus;
in response to the predetermined event being detected on a second output bus from a second subsystem in the device under management, decoupling the first output bus from the client computer and coupling the second output bus to the client computer via the multiplexor, wherein the predefined output on the second subsystem bus is a predefined anomaly in the second subsystem.

13. The method of claim 12, wherein the predetermined event on the second output bus is a greater amount of data traffic than an amount of data traffic found on the first output bus.

14. The method of claim 12, wherein the predefined anomaly is a temperature reading on the second subsystem that exceeds a predetermined level.

15. The method of claim 12, wherein the second subsystem comprises a second subsystem processor, and wherein the predefined anomaly is a processor usage level in the second subsystem processor that exceeds a predetermined level.

16. The method of claim 12, wherein the device under management is a server, and wherein the multiple subsystems in the server comprise an Baseboard Management Controller (BMC), a Hard Drive Controller (HDC), a Field Programmable Gate Array (FPGA), a Basic Input/Output System (BIOS), and an Ethernet device alert to be displayed on said another computer.

17. The system of claim 1, wherein the device under management is a server.

* * * * *